(12) United States Patent
Lee et al.

(10) Patent No.: US 11,793,241 B2
(45) Date of Patent: Oct. 24, 2023

(54) AEROSOL GENERATING DEVICE HAVING A PLURALITY OF SENSORS

(71) Applicant: KT&G CORPORATION, Daejeon (KR)

(72) Inventors: Seung Won Lee, Gwangmyeong-si (KR); Yong Hwan Kim, Anyang-si (KR); Sung Wook Yoon, Suwon-si (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 17/982,158

(22) Filed: Nov. 7, 2022

(65) Prior Publication Data

US 2023/0065181 A1    Mar. 2, 2023

Related U.S. Application Data

(63) Continuation of application No. 17/267,882, filed as application No. PCT/KR2020/018879 on Dec. 22, 2020.

(30) Foreign Application Priority Data

Feb. 13, 2020    (KR) ......................... 10-2020-0017714

(51) Int. Cl.
*A24F 40/53* (2020.01)
*A24F 40/40* (2020.01)
(Continued)

(52) U.S. Cl.
CPC .............. *A24F 40/51* (2020.01); *A24F 40/40* (2020.01); *A24F 40/53* (2020.01)

(58) Field of Classification Search
CPC .......... A24F 40/51; A24F 40/53; A24F 40/40; A24F 40/20; A24F 40/465
See application file for complete search history.

(56) References Cited

U.S. PATENT DOCUMENTS 9,717,277 B2    8/2017  Mironov
10,843,846 B2 * 11/2020  Murphy .................. A24F 40/40
(Continued)

FOREIGN PATENT DOCUMENTS

KR    10-2016-0016552 A    2/2016
KR        10-1648324 B1    8/2016
(Continued)

OTHER PUBLICATIONS

Extended European Search Report dated Nov. 24, 2021 in Application No. 20855853.6.
(Continued)

*Primary Examiner* — Hae Moon Hyeon
(74) *Attorney, Agent, or Firm* — Sughrue Mion, PLLC

(57)    ABSTRACT

An aerosol generating device according to one embodiment includes: a housing that forms an exterior of the aerosol generating device and includes an opening into which a cigarette is inserted; a heater that generates an aerosol by heating the cigarette; a battery that supplies power to the heater; a temperature sensor that senses a temperature of an internal component of the aerosol generating device; and a controller that prevents abnormal operation of the aerosol generating device based on the temperature of the internal component sensed by the temperature sensor.

5 Claims, 5 Drawing Sheets

(51) Int. Cl.
*A24F 40/20* (2020.01)
*A24F 40/51* (2020.01)

(56) References Cited

U.S. PATENT DOCUMENTS

| | | | |
|---|---|---|---|
| 11,019,848 B2 | 6/2021 | Rojo-Calderon | |
| 11,425,936 B2 | 8/2022 | Otiaba et al. | |
| 11,457,661 B2 | 10/2022 | Han et al. | |
| 2015/0327596 A1* | 11/2015 | Alarcon | H04L 67/535 |
| | | | 131/328 |
| 2017/0055587 A1* | 3/2017 | Zinovik | H05B 6/108 |
| 2018/0310617 A1* | 11/2018 | Ding | H05B 1/0227 |
| 2020/0154771 A1 | 5/2020 | Otiaba et al. | |
| 2020/0154788 A1* | 5/2020 | Novak, III | A24F 40/48 |
| 2020/0260791 A1 | 8/2020 | Lee et al. | |
| 2020/0397054 A1* | 12/2020 | Riva Reggiori | A24F 40/53 |
| 2021/0076745 A1 | 3/2021 | Akao et al. | |

FOREIGN PATENT DOCUMENTS

| | | |
|---|---|---|
| KR | 10-2018-0073626 A | 7/2018 |
| KR | 10-2018-0129637 A | 12/2018 |
| KR | 10-2019-0024880 A | 3/2019 |
| KR | 10-2019-0127967 A | 11/2019 |
| KR | 10-2019-0129758 A | 11/2019 |
| WO | 2013/098397 A2 | 7/2013 |
| WO | 2014/102091 A1 | 7/2014 |
| WO | 2018/192722 A1 | 10/2018 |
| WO | 2019/066245 A1 | 4/2019 |
| WO | 2019/115464 A1 | 6/2019 |
| WO | 2019/122344 A1 | 6/2019 |
| WO | 2019/206916 A1 | 10/2019 |
| WO | 2019/229955 A1 | 12/2019 |

OTHER PUBLICATIONS

International Search Report dated Apr. 1, 2021, issued by the International Searching Authority in application No. PCT/KR2020/018879.

Office Action dated Jul. 12, 2022 from the Japanese Patent Office in JP Application No. 2021-535855.

Preliminary Examination dated Aug. 12, 2022 from the Korean Intellectual Property Office in KR Application No. 10-2022-0007252.

* cited by examiner

[Figure 1]
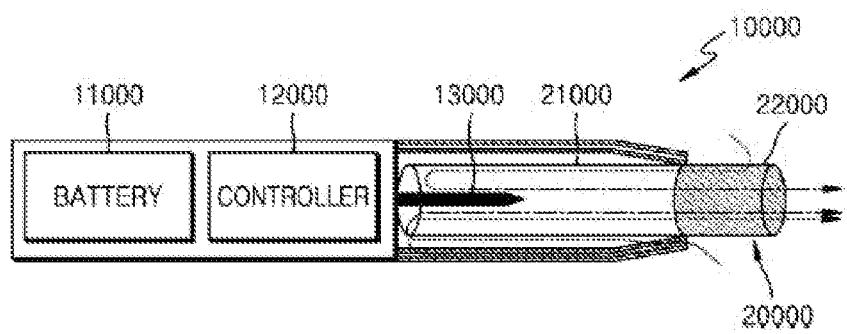
[Figure 2]
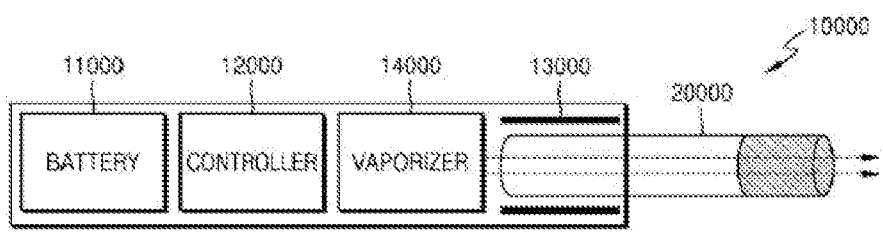
[Figure 3A]
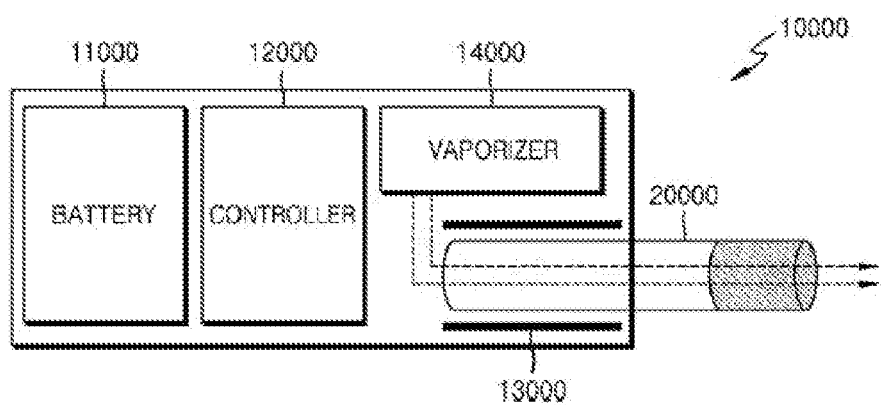

[Figure 4]
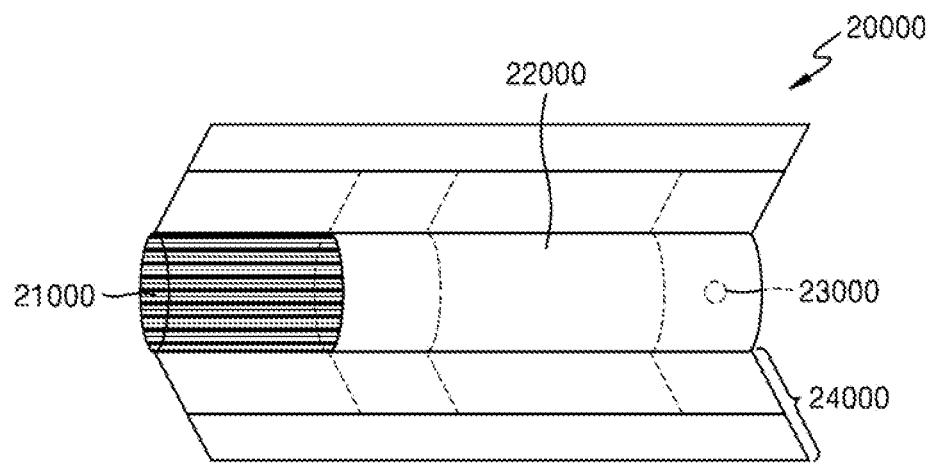
[Figure 5]
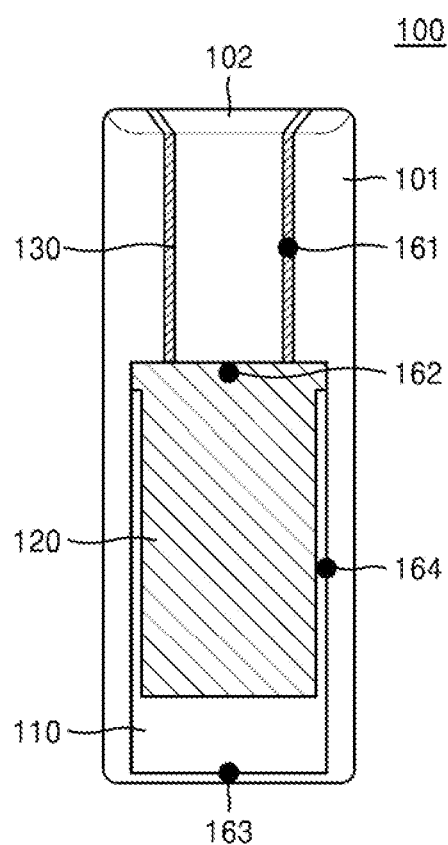

【Figure 6】
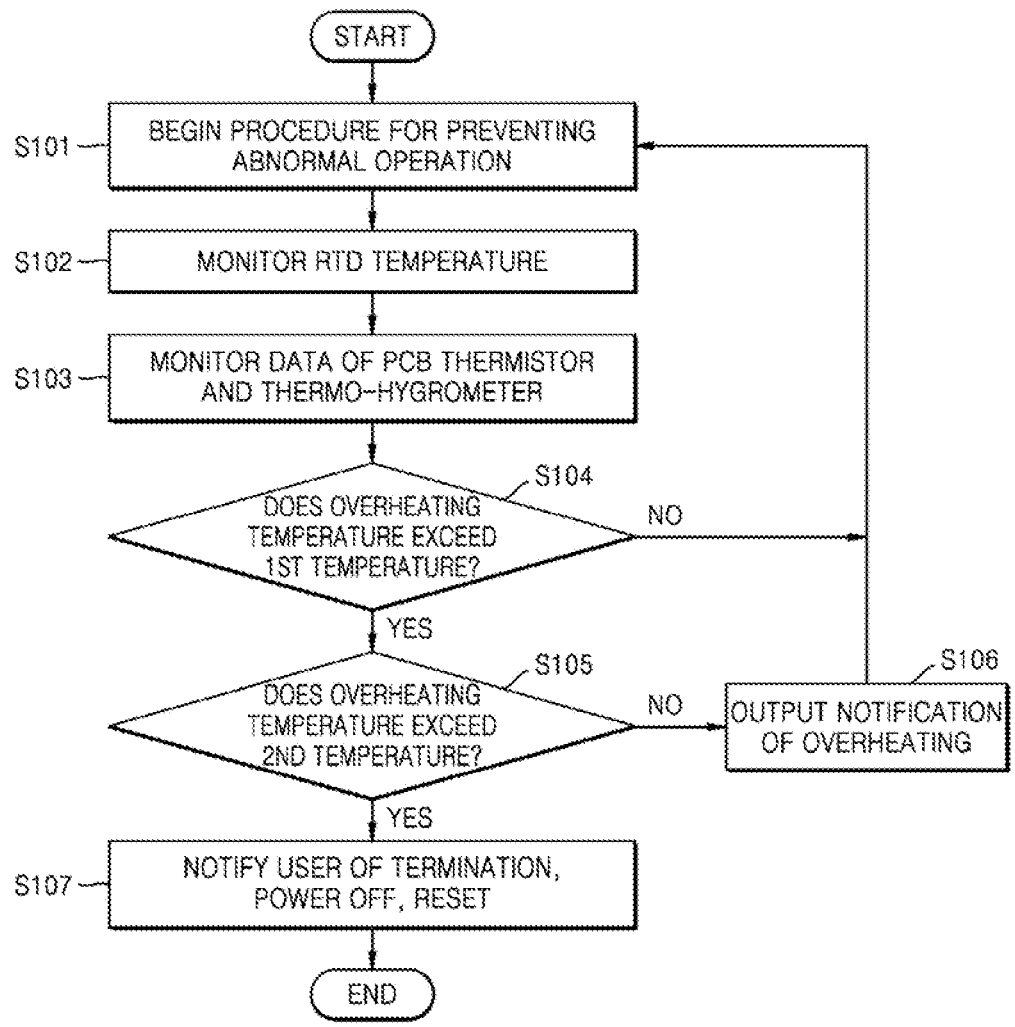

[Figure 7]
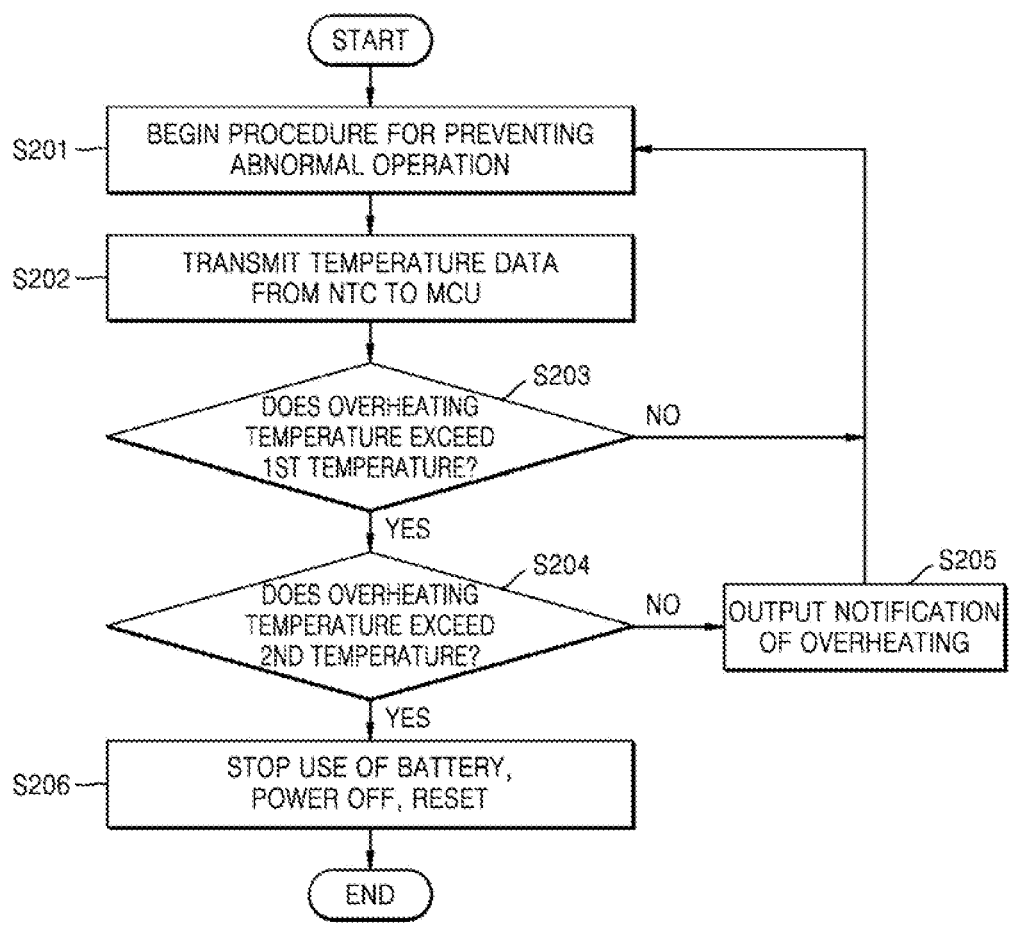

AEROSOL GENERATING DEVICE HAVING A PLURALITY OF SENSORS

CROSS REFERENCE TO RELATED APPLICATIONS

This application is a continuation of U.S. application Ser. No. 17/267,882 filed on Feb. 11, 2021, which is a National Stage of International Application No. PCT/KR2020/018879 filed Dec. 22, 2020, claiming priority based on Korean Patent Application No. 10-2020-0017714 filed Feb. 13, 2020.

BACKGROUND OF THE INVENTION

Embodiments relate to an aerosol generating device and an operation method thereof, and more particularly, to an aerosol generating device capable of ensuring stability in various use environments, and an operation method thereof.

In recent years, a need for an alternative to traditional cigarettes has been growing. For example, many people use an aerosol generating device that generates an aerosol by heating an aerosol generating material, rather than smoking combustive cigarettes. Accordingly, research on a heating-type cigarette and a heating-type aerosol generating device is being actively conducted.

An aerosol generating device generates an aerosol by using a heater for heating to a high temperature. In this case, there is a problem that a dangerous situation may occur due to overheating of a device, an overcurrent, a short circuit, and over discharging and overcharging of a battery in various use environments of an aerosol generating device.

BRIEF SUMMARY OF THE INVENTION

Embodiments provide an aerosol generating device and an operation method of the aerosol generating device which prevent the aerosol generating device described above from being in a dangerous situation.

Problems to be solved by the embodiments are not limited to the above-described problem, and undescribed problems will be clearly understood by those skilled in the art to which the present disclosure belongs from the present specification and the accompanying drawings.

According to one embodiment, an aerosol generating device may include a housing that forms an exterior of the aerosol generating device and includes an opening into which a cigarette is inserted, a heater that generates an aerosol by heating the cigarette, a battery that supplies power to the heater, a temperature sensor that senses a temperature of an internal component of the aerosol generating device, and the controller that prevents abnormal operation of the aerosol generating device based on the temperature of the internal component sensed by the temperature sensor.

According to another embodiment, a method of controlling an aerosol generating device including a heater for heating a cigarette to generate an aerosol, a battery for supplying power to the heater, and a controller, may include sensing a temperature of an internal component of the aerosol generating device by using a temperature sensor, determining abnormal operation of the aerosol generating device based on the temperature of the internal component sensed by the temperature sensor, and stopping operation of the aerosol generating device when the aerosol generating device is in an abnormal operation state.

Aerosol generating devices according to embodiments may ensure stability when a dangerous situation occurs due to overheating, an overcurrent, a circuit short, over discharging and overcharging of a battery, and so on that may occur in various use environments.

Effects by the embodiments are not limited to the above-described effects, and effects that are not described will be clearly understood by those skilled in the art to which the present disclosure belongs from the present specification and the accompanying drawings.

BRIEF DESCRIPTION OF THE DRAWINGS

FIGS. 1 to 3B are diagrams illustrating examples in which a cigarette is inserted into an aerosol generating device;

FIG. 4 illustrates an example of a cigarette;

FIG. 5 is a schematic cross-sectional view of an aerosol generating device according to an embodiment;

FIG. 6 is a flowchart illustrating an exemplary operation method of the aerosol generating device according to the embodiment illustrated in FIG. 5; and FIG. 7 is a flowchart illustrating another exemplary operation method of the aerosol generating device according to the embodiment illustrated in FIG. 5.

DETAILED DESCRIPTION OF THE INVENTION

Figure 3B:
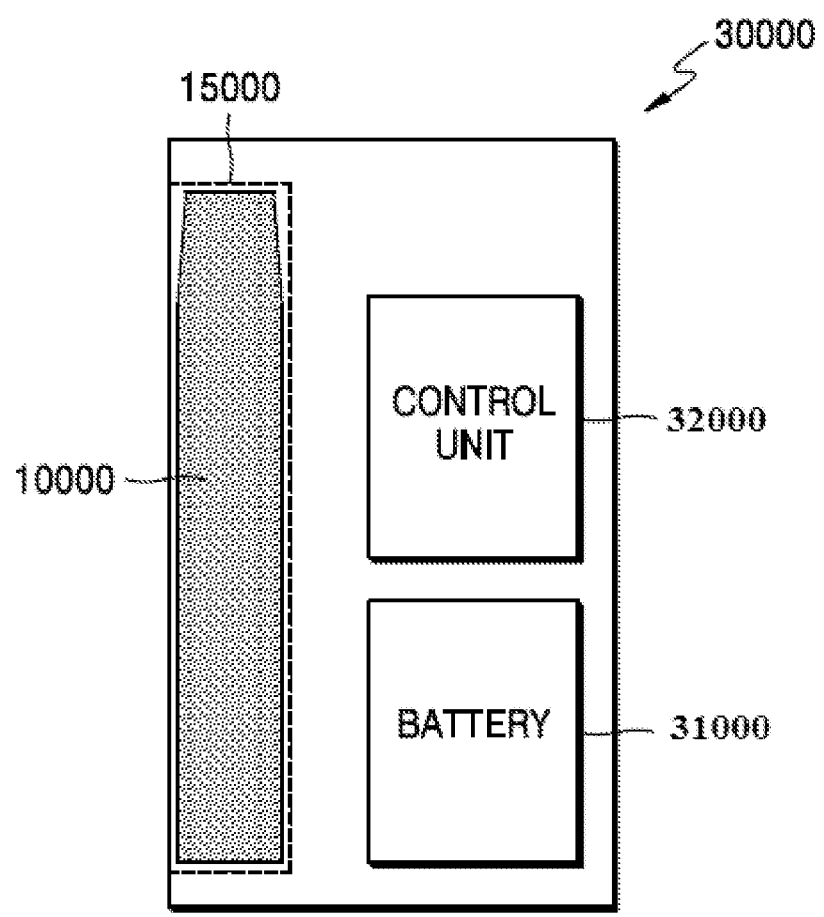

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIGS. 1 through 3 are diagrams showing examples in which a cigarette is inserted into an aerosol generating device.

Referring to FIG. 1, the aerosol generating device 10000 may include a battery 11000, a controller 12000, and a heater 13000. Referring to FIGS. 2 and 3, the aerosol generating device 10000 may further include a vaporizer 14000. Also, a cigarette 20000 may be inserted into an inner space of the aerosol generating device 10000.

FIGS. 1 through 3 illustrate components of the aerosol generating device 10000, which are related to the present embodiment. Therefore, it will be understood by one of ordinary skill in the art related to the present embodiment that other general-purpose components may be further included in the aerosol generating device 10000, in addition to the components illustrated in FIGS. 1 through 3.

Also, FIGS. 2 and 3 illustrate that the aerosol generating device 10000 includes the heater 13000. However, as necessary, the heater 13000 may be omitted.

FIG. 1 illustrates that the battery 11000, the controller 12000, and the heater 13000 are arranged in series. Also, FIG. 2 illustrates that the battery 11000, the controller 12000, the vaporizer 14000, and the heater 13000 are arranged in series. Also, FIGS. 3A and 3B illustrate that the vaporizer 14000 and the heater 13000 are arranged in parallel. However, the internal structure of the aerosol generating device 10000 is not limited to the structures illustrated in FIGS. 1 through 3. In other words, according to the design of the aerosol generating device 100, the battery 11000, the controller 12000, the heater 13000, and the vaporizer 14000 may be differently arranged.

When the cigarette 20000 is inserted into the aerosol generating device 100, the aerosol generating device 10000 may operate the heater 13000 and/or the vaporizer 14000 to generate aerosol from the cigarette 20000 and/or the vaporizer 14000. The aerosol generated by the heater 13000 and/or the vaporizer 14000 is delivered to a user by passing through the cigarette 20000.

As necessary, even when the cigarette 20000 is not inserted into the aerosol generating device 10000, the aerosol generating device 10000 may heat the heater 13000.

The battery 11000 supplies electric power to be used for the aerosol generating device 10000 to operate. For example, the battery 11000 may supply power to heat the heater 13000 or the vaporizer 14000, and may supply power for operating the controller 12000. Also, the battery 11000 may supply power for operation of a display, a sensor, a motor, etc. mounted in the aerosol generating device 10000.

The controller 12000 may generally control operation of the aerosol generating device 10000. In detail, the controller 12000 may control not only operation of the battery 11000, the heater 13000, and the vaporizer 14000, but also operation of other components included in the aerosol generating device 10000. Also, the controller 12000 may check a state of each of the components of the aerosol generating device 10000 to determine whether or not the aerosol generating device 10000 is able to operate.

The controller 12000 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13000 may be heated by the power supplied from the battery 11000. For example, when the cigarette 20000 is inserted into the aerosol generating device 10000, the heater 13000 may be located outside the cigarette 20000. Thus, the heated heater 13000 may increase a temperature of an aerosol generating material in the cigarette 20000.

The heater 13000 may include an electro-resistive heater. For example, the heater 13000 may include an electrically conductive track, and the heater 13000 may be heated when currents flow through the electrically conductive track. However, the heater 13000 is not limited to the example described above and may include any other heaters which may be heated to a desired temperature. Here, the desired temperature may be pre-set in the aerosol generating device 10000 or may be set by a user.

As another example, the heater 13000 may include an induction heater. In detail, the heater 13000 may be an electrically conductive coil wound around an inner space of the aerosol generating device 10000 where a cigarette is accommodated, and the cigarette may include a susceptor which may be heated by an induction heating method.

For example, the heater 13000 may include a tube-type heating element, a plate-type heating element, a needle-type heating element, or a rod-type heating element, and may heat the inside or the outside of the cigarette 20000, according to the shape of the heating element.

Also, the aerosol generating device 10000 may include a plurality of heaters 13000. Here, the plurality of heaters 13000 may be inserted into the cigarette 20000 or may be arranged outside the cigarette 20000. Also, some of the plurality of heaters 13000 may be inserted into the cigarette 20000 and the others may be arranged outside the cigarette 20000. In addition, the shape of the heater 13000 is not limited to the shapes illustrated in FIGS. 1 through 3 and may include various shapes.

The vaporizer 14000 may generate aerosol by heating a liquid composition and the generated aerosol may pass through the cigarette 20000 to be delivered to a user. In other words, the aerosol generated via the vaporizer 14000 may move along an air flow passage of the aerosol generating device 10000 and the air flow passage may be configured such that the aerosol generated via the vaporizer 14000 passes through the cigarette 20000 to be delivered to the user.

For example, the vaporizer 14000 may include a liquid storage, a liquid delivery element, and a heating element, but it is not limited thereto. For example, the liquid storage, the liquid delivery element, and the heating element may be included in the aerosol generating device 10000 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14000 or may be formed integrally with the vaporizer 14000.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14000 may be referred to as a cartomizer or an atomizer, but it is not limited thereto.

The aerosol generating device 10000 may further include general-purpose components in addition to the battery 11000, the controller 12000, the heater 13000, and the vaporizer 14000. For example, the aerosol generating device 10000 may include a display capable of outputting visual information and/or a motor for outputting haptic information. Also, the aerosol generating device 10000 may include at least one sensor (e.g., a puff detecting sensor, a temperature detecting sensor, a cigarette insertion detecting sensor, etc.). Also, the aerosol generating device 10000 may be formed as a structure that, even when the cigarette 20000 is inserted into the aerosol generating device 10000, may introduce external air or discharge internal air.

Although not illustrated in FIGS. 1 through 3B, the aerosol generating device 10000 and an additional cradle 30000 may form together a system. For example, the cradle 30000 may include an accommodation space 15000 in which the aerosol generating device 10000 can be accommodated. Also, the cradle 30000 may include a control unit 32000 and a battery 31000 used to charge the battery 11000 of the aerosol generating device 10000. Alternatively, the heater 13000 may be heated when the cradle and the aerosol generating device 10000 are coupled to each other.

A cigarette 20000 may be similar to a general combustive cigarette. For example, the cigarette 20000 may be divided into a first portion including an aerosol generating material and a second portion including a filter, etc. Alternatively, the second portion of the cigarette 20000 may also include an aerosol generating material. For example, an aerosol generating material made in the form of granules or capsules may be inserted into the second portion.

The entire first portion may be inserted into the aerosol generating device 10000, and the second portion may be exposed to the outside. Alternatively, only a portion of the first portion may be inserted into the aerosol generating device 10000, or the entire first portion and a portion of the second portion may be inserted into the aerosol generating device 10000. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 10000. For example, opening and closing of the air passage and/or a size of the air passage formed in the aerosol generating device 10000 may be adjusted by the user. Accordingly, the amount of smoke and a smoking impression may be adjusted by the user. As another example, the external air may flow into the cigarette 20000 through at least one hole formed in a surface of the cigarette 20000.

Hereinafter, one embodiment will be described in detail with reference to FIG. 4.

FIG. 4 is a view illustrating an example of a cigarette.

Referring to FIG. 4, the cigarette 20000 may include a tobacco rod 21000 and a filter rod 22000. The first portion described above with reference to FIGS. 1 through 3 may include the tobacco rod 21000, and the second portion may include the filter rod 22000.

FIG. 4 illustrates that the filter rod 22000 includes a single segment, but is not limited thereto. In other words, the filter rod 22000 may include a plurality of segments. For example, the filter rod 22000 may include a first segment configured to cool an aerosol and a second segment configured to filter a certain component included in the aerosol. Also, as necessary, the filter rod 22000 may further include at least one segment configured to perform other functions.

The cigarette 20000 may be packaged by at least one wrapper 24000. The wrapper 24000 may have at least one hole through which external air may be introduced or internal air may be discharged. For example, the cigarette 20000 may be packaged by one wrapper 24000. As another example, the cigarette 20000 may be double-packaged by two or more wrappers 24000. For example, the tobacco rod 21000 may be packaged by a first wrapper, and the filter rod 22000 may be packaged by a second wrapper. Also, the tobacco rod 21000 and the filter rod 22000, which are respectively packaged by separate wrappers, may be coupled to each other, and the entire cigarette 20000 may be repackaged by a third wrapper. When each of the tobacco rod 21000 or the filter rod 22000 includes a plurality of segments, each segment may be packaged by a separate wrapper. Also, the entire cigarette 20000 including the plurality of segments, which are respectively packaged by the separate wrappers and are coupled to each other, may be re-packaged by another wrapper.

The tobacco rod 21000 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21000 may include other additives, such as flavors, a wetting agent, and/or organic acid. Also, the tobacco rod 21000 may include a flavored liquid, such as menthol or a moisturizer, which is injected to the tobacco rod 21000.

The tobacco rod 21000 may be manufactured in various forms. For example, the tobacco rod 21000 may be formed as a sheet or a strand. Also, the tobacco rod 21000 may be formed as a pipe tobacco, which is formed of tiny bits cut from a tobacco sheet. Also, the tobacco rod 21000 may be surrounded by a heat conductive material. For example, the heat-conducting material may be, but is not limited to, a metal foil such as aluminum foil. For example, the heat conductive material surrounding the tobacco rod 21000 may uniformly distribute heat transmitted to the tobacco rod 21000, and thus, the heat conductivity applied to the tobacco rod may be increased and taste of the tobacco may be improved. Also, the heat conductive material surrounding the tobacco rod 21000 may function as a susceptor heated by the induction heater. Here, although not illustrated in the drawings, the tobacco rod 21000 may further include an additional susceptor, in addition to the heat conductive material surrounding the tobacco rod 21000.

The filter rod 22000 may include a cellulose acetate filter. Shapes of the filter rod 22000 are not limited. For example, the filter rod 22000 may include a cylinder-type rod or a tube-type rod having a hollow inside. Also, the filter rod 22000 may include a recess-type rod. When the filter rod 22000 includes a plurality of segments, at least one of the plurality of segments may have a different shape.

The filter rod 22000 may be formed to generate flavors. For example, a flavoring liquid may be injected onto the filter rod 22000, or an additional fiber coated with a flavoring liquid may be inserted into the filter rod 22000.

Also, the filter rod 22000 may include at least one capsule 23000. Here, the capsule 23000 may perform a function of generating flavor or a function of generating aerosol. For example, the capsule 23000 may have a configuration in which a liquid containing a flavoring material is wrapped with a film. For example, the capsule 23000 may have a spherical or cylindrical shape, but is not limited thereto.

When the filter rod 22000 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Meanwhile, although not shown in FIG. 4, the cigarette 20000 according to an embodiment may further include a front-end filter. The front-end filter is located on one side of the tobacco rod 21000, which is not facing the filter rod 22000. The front-end filter may prevent the tobacco rod 21000 from being detached and prevent a liquefied aerosol from flowing into the aerosol generating device 10000 (FIGS. 1 through 3) from the tobacco rod 21000, during smoking.

FIG. 5 is a schematic cross-sectional view of an aerosol generating device according to an embodiment. Hereinafter, content described above with respect to the aerosol generating device 10000 of FIGS. 1-4 may also be applied to an aerosol generating device which will be described below.

Referring to FIG. 5, an aerosol generating device 100 may include a housing 101, a battery 110, a printed circuit board 120, a heater 130, and temperature sensors 161, 162, 163, and 164.

The housing 101 forms an exterior of the aerosol generating device 100. In addition, an opening 102 into which a cigarette is inserted is formed at one side of the housing 101.

The printed circuit board 120 may include a controller. For example, the controller may be a microcontroller unit (MCU). The MCU is hardware that controls overall operation of the aerosol generating device 100. The MCU includes at least one processor. A processor may also be implemented by an array of a plurality of logic gates or may also be implemented by a combination of a general-purpose microprocessor and a memory in which a program executable in the microprocessor is stored. In addition, it may be understood by those skilled in the art to which the present embodiment belongs that the processor may be implemented by other types of hardware.

The MCU may control the overall operation of the heater 130. In an embodiment, the MCU may control power supplied to the heater 130 based on a value sensed by at least one sensor so that the operation of the heater 130 starts or ends. In addition, the MCU may control the amount of power supplied to the heater 130 and a time when power is supplied based on a value sensed by at least one sensor so that the heater 130 may be heated to a predetermined temperature or may maintain an appropriate temperature.

As will be described below, the MCU may monitor temperatures of internal components through at least one of the temperature sensors 161, 162, 163, and 164, and may prevent abnormal operation of the aerosol generating device 100 based on the temperatures of the internal components of the aerosol generating device 100.

The temperature sensors 161, 162, 163, and 164 may sense temperatures of internal components arranged inside the housing 101 of the aerosol generating device 100. For example, the internal components may include the battery 110, the printed circuit board 120 on which a controller is arranged, and the heater 130. The internal components further include other components in addition to the above-described components.

The aerosol generating device 100 may include a first temperature sensor 161 that senses a temperature of the heater 130, a second temperature sensor 162 that senses a temperature of the printed circuit board 120, and a third temperature sensor 163 that is arranged inside the housing 101 and senses a temperature of the outside of the aerosol generating device 100, and a battery temperature sensor 164 that senses a temperature of the battery 110. In addition, the aerosol generating device 100 may further include another temperature sensor that senses temperatures of other components in addition to the above-described components.

The first temperature sensor 161 may be arranged on the heater 130 to sense a temperature of the heater 130. The first temperature sensor 161 may measure the temperature of the heater 130 in a contact or non-contact manner. For example, the first temperature sensor 161 may be a resistance temperature detector (RTD) sensor. If the aerosol generating device 100 heats a cigarette by using an induction heating method, the first temperature sensor 161 may be arranged on a susceptor to sense a temperature of the susceptor. Further, the first temperature sensor 161 may be a type of sensor that is not affected by a magnetic field applied by a coil.

The second temperature sensor 162 may sense an internal temperature of the aerosol generating device 100. For example, the second temperature sensor 162 may be a thermistor. The second temperature sensor 162 may be arranged at a point where heat generation is high in the aerosol generating device 100. For example, the second temperature sensor 162 may be arranged to sense a temperature of the printed circuit board 120. In particular, a temperature of a point adjacent to the heater 130 on the printed circuit board 120 may be the highest, and thus, the second temperature sensor 162 may sense the temperature of the point adjacent to the heater 130 on the printed circuit board 120.

The third temperature sensor 163 may sense a temperature of the external environment of the aerosol generating device 100. The third temperature sensor 163 may be installed at a point where heat generation is the lowest inside the aerosol generating device 100 and where a temperature is the closest to the external environment. For example, the third temperature sensor 163 may be arranged at the opposite side of the housing 101 from the opening 102 to sense an external temperature. In an embodiment, the third temperature sensor 163 may measure a temperature and humidity together as necessary.

The battery temperature sensor 164 may sense a temperature of the battery 110. For example, the battery temperature sensor 164 may be a negative temperature coefficient (NTC) sensor. The battery temperature sensor 164 may be arranged on a side surface, front surface, and/or rear surface of the battery 110 to sense a surface temperature of the battery 110. Also, the battery temperature sensor 164 may be arranged around the battery 110 to sense a surface temperature of the battery 110.

Meanwhile, the temperature sensors 161, 162, 163, and 164 are not limited to the above-described types, and other types of temperature sensors may be installed in the aerosol generating device 100 as needed.

FIG. 6 is a flowchart illustrating an exemplary operation method of the aerosol generating device according to the embodiment illustrated in FIG. 5.

Referring to 6, in step S101, when the aerosol generating device 100 enters a power-on state, a controller (e.g., an MCU) begins a stable operation procedure for preventing abnormal operation of the aerosol generating device based on the temperatures of internal components of the aerosol generating device 100.

In step S102, the first temperature sensor 161 (for example, an RTD sensor) may sense a temperature of the heater 130 and transmit temperature data of the heater 130 to the MCU. Accordingly, the MCU may monitor the temperature of the heater 130.

In step S103, the second temperature sensor 162 (for example, a thermistor) may sense a temperature of the printed circuit board 120 and transmit temperature data of the printed circuit board 120 to the MCU. Accordingly, the MCU may monitor the temperature of the printed circuit board 120. In addition, the third temperature sensor 163 (for example, a thermo-hygrometer) may sense an external temperature of the housing 101 of the aerosol generating device 100, and transmit data of the sensed temperature to the MCU. Therefore, the MCU may monitor the external temperature. In FIG. 6, step S102 and step S103 are illustrated as sequential steps, but the order of performing the steps are not limited thereto. For example, the first temperature sensor 161 through the third temperature sensor 163 may simultaneously sense temperatures of internal components. Also, step 103 may be performed after step 102.

In step S104, the MCU determines whether or not the temperature sensed by each of the temperature sensors 161, 162, and 163 is higher than or equal to a preset first temperature. In this case, the first temperature may indicate a temperature that is measured when the components are overheated.

In step S104, when temperatures of one or more of the internal components are higher than or equal to the preset first temperature, the procedure may proceed to step S105. However, when temperature of the respective internal components are less than the first temperature, the MCU repeats step S104 until it is determined that temperatures of one or more of the internal components are higher than or equal to the first temperature.

In step S105, the MCU determines whether or not the temperatures sensed by the respective temperature sensors 161, 162, and 163 are higher than or equal to a preset second temperature. In this case, the second temperature is higher than the first temperature described above and may indicate that the aerosol generating device 100 is operating abnormally beyond being overheated.

In step S105, when temperatures of one or more of the internal components are higher than or equal to the present second temperature, the method may proceed to step S107. In step S107, the MCU determines that the aerosol generating device 100 operates abnormally. Also, the MCU may output a notification of termination of the aerosol generating device 100 to a user, and stop operation of the aerosol generating device 100. In addition, the aerosol generating device 100 may also be reset to solve the generated problem.

The MCU may apply an enable signal to at least one low-dropout regulator (LDO) (not illustrated) for controlling supply of a voltage or a current to internal components that consume power to operate the aerosol generating device 100. The LDO may indicate hardware that provides regulated voltage/current to internal components that consume power by using power delivered from the battery 110.

In order to stop operation of the aerosol generating device 100, for example, the MCU may not apply an enable signal to at least one LDO. Accordingly, at least one LDO may be disabled, and an electrical connection between the battery 110 and internal components that consume power connected through each of at least one LDO may be cut off. Internal components that are connected to each of at least one LDO and consume power may be deactivated as the electrical connection with the battery 110 is cut off, and accordingly, operation of the aerosol generating device 100 may stop.

In step S105, when temperatures of the respective internal components are less than the second temperature, the procedure may proceed to step S106. In this case, one or more of the internal components does not reach an abnormal operation temperature but is still higher than a normal operating temperature. Therefore, an overheating notification is output to a user. For example, the overheating notification may be output by a display capable of outputting the visual information described above and/or by a motor capable of outputting tactile information. Accordingly, a user may recognize that the aerosol generating device 100 is in an overheated state, and the user may take appropriate measures such as temporarily stopping use of the aerosol generating device 100 or lowering a temperature of the heater 130. After the overheating notification is output in step S106, the MCU repeats step S105 to monitor temperatures of the respective internal components again.

In the above-described embodiment, temperatures of internal components of the aerosol generating device 100 are determined based on an overheating temperature and an abnormal temperature, and an overheating notification is output to a user before an abnormal operation notification. Therefore, the aerosol generating device 100 may operate stably.

FIG. 7 is a flowchart illustrating another exemplary operation method of the aerosol generating device according to the embodiment illustrated in FIG. 5.

Referring to FIG. 7, in step S201, when the aerosol generating device 100 enters a power-on state, an MCU begins a stable battery operation procedure for preventing abnormal operation of the aerosol generating device 100 based on the temperature of the battery 110.

When the battery 110 is damaged for some reason, the temperature of the battery 110 becomes higher than the temperature during normal operation. Accordingly, when the battery outputs an overcurrent or when the battery is overcharged, overly discharged, short-circuited, or overheated, the MCU may begin a stable battery operation procedure based on the sensed temperature.

In step S202, the battery temperature sensor 164 (for example, an NTC sensor) may sense the temperature of the battery 110 and transmit temperature data of the battery 110 to an MCU. Accordingly, the MCU may monitor the temperature of the battery 110.

In step S203, the MCU determines whether or not the temperature sensed by the battery temperature sensor 164 is higher than or equal to a preset first battery temperature. In this case, the first battery temperature may indicate a temperature that is above a temperature range of the battery 110 during normal operation.

When the temperature of the battery 110 is higher than or equal to the preset first battery temperature in step S203, the procedure may proceed to the step S204. However, when the temperature of the battery 110 is less than the first battery temperature, the MCU repeats step S203 until it is determined that the temperature of the battery 110 is higher than or equal to the first battery temperature.

In step S204, the MCU determines whether or not the temperature sensed by the battery temperature sensor 164 is higher than or equal to a preset second battery temperature. In this case, the second battery temperature is higher than the first battery temperature described above, and may indicate that the battery 110 (or the aerosol generating device 100) is operating abnormally beyond being overheated.

When the temperature of the battery 110 is higher than or equal to the preset second battery temperature in step S204, the processing may proceed to step S206. In step S206, the MCU determines that the battery 110 operates abnormally. Therefore, the MCU may stop use of the battery 110 and operation of the aerosol generating device 100. In addition, the aerosol generating device 100 may also be reset to solve the generated problem.

However, when the temperature of the battery 110 is less than the second battery temperature in step S204, the procedure may proceed to step S205. In this case, the battery 110 does not reach an abnormal operation temperature but is still overheated. Thus, an overheating notification of the battery is output to a user. For example, the overheating notification of the battery may be output by a display capable of outputting the visual information described above and/or a motor capable of outputting tactile information. Accordingly, a user may recognize that the battery 110 is in an overheated state, and the user may take an appropriate measure, such as temporarily stopping use of the aerosol generating device 100, etc. After the overheating notification of the battery 110 is output in step S205, the MCU repeats step S204 to monitor the temperature of the battery 110 again.

At least one of the components, elements, modules or units (collectively "components" in this paragraph) represented by a block in the drawings such as the controller 12000, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

One embodiment may also be implemented in the form of a recording medium including instructions executable by a computer, such as a program module executable by the computer. A computer-readable medium may be any available medium that is accessible by a computer and includes both volatile and nonvolatile media, and removable and non-removable media. In addition, the computer-readable medium may include both a computer storage medium and a communication medium. The computer storage medium includes all of volatile and nonvolatile, and removable and non-removable media implemented by any method or technology for storage of information such as computer-readable instructions, data structures, program modules or other data. The communication medium typically includes computer-readable instructions, data structures, other data in modulated data signals such as program modules, or other transmission mechanisms, and includes any information transfer media.

Those skilled in the technical field relating to the present embodiment will appreciate that the present embodiment may be implemented in a modified form without departing from the essential characteristics of the description. Therefore, the disclosed methods should be considered in a descriptive sense only and not for purposes of limitation. The scope of the present disclosure is shown in the claims rather than the foregoing description, and all differences within the scope equivalent thereto should be construed as being included in the present disclosure.

The invention claimed is:

1. An aerosol generating system comprising:
an aerosol generating device having a first accommodation space into which an aerosol generating article including a susceptor can be inserted; and
a cradle having a second accommodation space in which the aerosol generating device can be accommodated,
wherein the aerosol generating device includes:
a battery that is to be charged by power received from the cradle while the aerosol generating device is accommodated in the second accommodation space;
a first temperature sensor that senses a temperature of the battery;
an induction coil that receives power from the battery to form a magnetic field in the first accommodation space;
a controller electrically connected to the induction coil and arranged on a printed circuit board; and
a second temperature sensor that senses a temperature of a point adjacent to the first accommodation space,
wherein the controller detects abnormal operation of the aerosol generating device based on a temperature sensed by at least one of the first temperature sensor and the second temperature sensor, and when the abnormal operation is detected, controls the aerosol generating device to output an overheating notification or stops operation of the aerosol generating device.

2. The aerosol generating system of claim 1, wherein, when the sensed temperature is equal to or higher than a first preset temperature, the controller controls the aerosol generating device to output the overheating notification or stops the operation of the aerosol generating device.

3. The aerosol generating system of claim 2, wherein, when the sensed temperature is equal to or higher than the first preset temperature and lower than a second preset temperature higher than the first preset temperature, the controller controls the aerosol generating device to output the overheating notification, and when the sensed temperature is equal to or higher than the second preset temperature, the controller stops the operation of the aerosol generating device.

4. The aerosol generating system of claim 1, wherein the first temperature sensor and the second temperature sensor are temperature sensors of different types.

5. The aerosol generating system of claim 1, wherein the induction coil is a solenoid wound along the first accommodation space, and the induction coil includes at least one of copper, silver, gold, aluminum, tungsten, zinc, and nickel.

* * * * *